US006958620B1

(12) United States Patent
Kozuki

(10) Patent No.: US 6,958,620 B1

(45) Date of Patent: Oct. 25, 2005

(54) RESOLVER MALFUNCTION DIAGNOSTIC CIRCUIT

(75) Inventor: Hiroyuki Kozuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/006,764

(22) Filed: Dec. 8, 2004

(30) Foreign Application Priority Data

Jul. 7, 2004 (JP) ............................ 2004-200661

(51) Int. Cl.[7] .............................................. G01R 31/34

(52) U.S. Cl. ..................................................... 324/772

(58) Field of Search ................................ 324/647, 656, 324/679, 705, 718, 772; 318/661; 702/35–36, 702/38, 57–59, 66

(56) References Cited

U.S. PATENT DOCUMENTS 6,577,957 B2 * 6/2003 Fujimoto et al. ............. 702/36

FOREIGN PATENT DOCUMENTS

JP 11-14691 A 1/1999
JP 2000-131096 A 5/2000

* cited by examiner

*Primary Examiner*—Bot LeDynh
(74) *Attorney, Agent, or Firm*—Sughrue Mion, PLLC

(57) ABSTRACT

An objective is to perform malfunction diagnosis such as a wire breakage of resolver windings using a simple circuit configuration, realize the cost down and reliability improvement for resolver malfunction diagnostic circuits, and reduce electric-power consumption in the resolver malfunction diagnostic circuits. A resolver malfunction diagnostic circuit includes a resolver-signal inputting circuit for, in response to rotation of a rotor, receiving signals from a resolver that outputs from its output winding rotational-angle signals corresponding to the rotor rotational angle, and the output winding is determined to be out of order when the amplitude of the output from the output winding is equal to or lower than a predetermined value, and a deviation between the center voltage of its output voltage and the center voltage in the normal operating state exceeds an allowable level.

1 Claim, 5 Drawing Sheets

RESOLVER MALFUNCTION DIAGNOSTIC CIRCUIT

BACKGROUND OF THE INVENTION

1. Field of the Invention

The present invention relates to malfunction diagnostic circuits for resolver wire breakages.

2. Description of the Related Art

FIG. 5 is a circuit diagram illustrating a configuration of a conventional resolver malfunction diagnostic circuit. A resolver malfunction diagnostic circuit is disclosed, in which a resolver-signal inputting circuit is configured such that a differential amplifier 10 receives signals through buffer circuits 6 and 7 from a resolver 1, which outputs, in response to rotation of a rotor, rotational-angle signals (sin θ·f(t) or cos θ·f(t)) corresponding to the rotational angle from output windings 3, and, when the output windings 3 are broken (refer to patent document 1), a wire-breakage detecting signal, which has a higher value than the maximum value obtained from the rotational-angle signals (sin θ·f(t) or cos θ·f(t)), is outputted from the differential amplifier 10, by DC bias being applied to the output windings 3.

[Patent document 1] Japanese Laid-Open Patent Publication 131,096/2000.

In such a conventional resolver malfunction diagnostic circuit, bias resistors $R_{BU}$ and $R_{BL}$, which, in an abnormal state, may make the voltage between the terminals of the output windings deviate from the normal range, have additionally needed to be provided.

An objective of the present invention, which has been made to solve the foregoing problem, is to perform malfunction diagnosis for wire breakages of resolver output windings using a simple circuit configuration, realize the cost down and the reliability improvement for resolver malfunction diagnostic circuits, and reduce electric-power consumption therein.

SUMMARY OF THE INVENTION

A resolver malfunction diagnostic circuit includes a resolver-signal inputting circuit for, in response to rotation of a rotor, receiving a signal from a resolver that outputs from its output windings rotational-angle signals corresponding to the rotor rotational angle, wherein the output winding is determined to be out of order when the amplitude of the output from the output winding is equal to or lower than a predetermined value, and the deviation between the center voltage of its output voltage and the center voltage in the normal operating state exceeds an allowable level.

DETAILED DESCRIPTION OF THE PREFERRED EMBODIMENT

Embodiment 1

Figure 1:
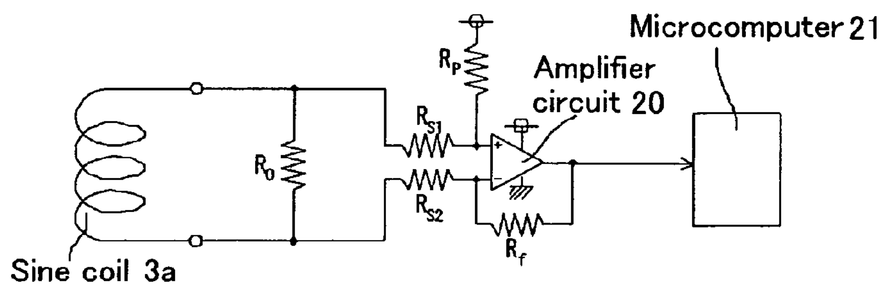
FIG. 1 is a circuit diagram illustrating a configuration of a resolver malfunction diagnostic circuit according to Embodiment 1 of the present invention.

FIG. 1 is a circuit diagram illustrating a configuration of a resolver malfunction diagnostic circuit according to the present invention. In FIG. 1, a resolver 1 outputs rotational-angle signals (sin θ·f(t) or cos θ·f(t)) corresponding to the rotational angle of a rotor from output windings 3 (a sine coil **3*a* and a cosine coil 3*b*), based on an excitation signal (for example, a sine wave signal) being applied to an excitation winding 2. Next, details of the configuration and operation of the resolver malfunction diagnostic circuit with respect to the sine coil 3*a* of the output windings 3 will be explained, while the explanation with respect to the cosine coil 3*b*** will be omitted because of the similar operation.

A wire-breakage detecting resistor $R_0$ is connected in parallel to the sine coil **3*a* of the output windings 3. To each of the connecting points between this sine coil 3*a* and the wire-breakage detecting resistor $R_0$, are connected the input terminals of an amplifier circuit 20 through buffer resistors $R_{S1}$ and $R_{S2}$, respectively, and the positive side input terminal of the amplifier circuit 20 is pulled-up across a pull-up resistor $R_P$. Here, the gain G of this amplifier circuit 20** is $$G = \text{feedback resistance } R_f / \text{buffer resistance } R_{S2}$$

The output from this amplifier circuit 20 is inputted into a microcomputer 21, then the microcomputer 21 processes, as will be described later, and determines whether the wire breakage occurs in the sine coil **3*a***.

Figure 2:
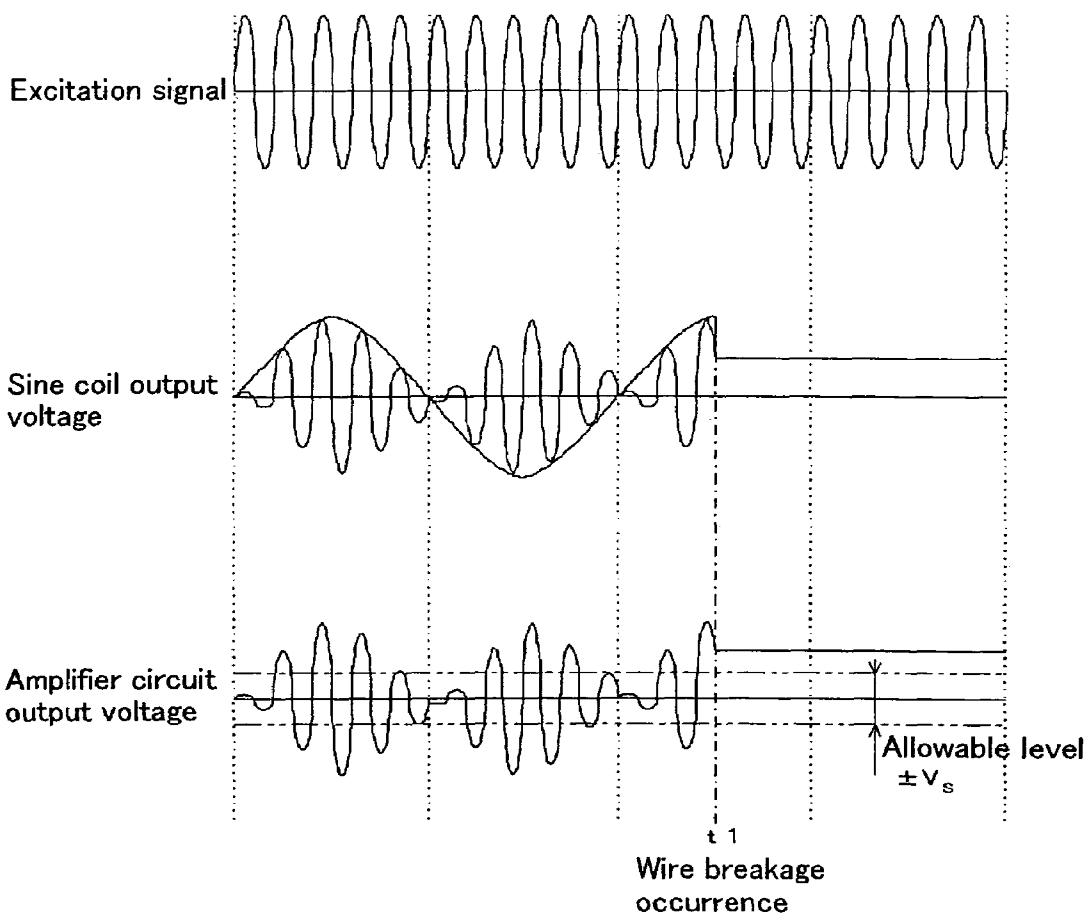
FIG. 2 is a waveform chart representing an operation of the resolver malfunction diagnostic circuit according to Embodiment 1 of the present invention.

Next, an operation in this resolver malfunction diagnostic circuit is explained. FIG. 2 is a waveform chart illustrating an operation of the resolver malfunction diagnostic circuit with the rotor being rotating, according to the present invention. The resolver is excited by the excitation signal applied to the excitation winding 2; consequently, it outputs from the sine coil **3*a* and the cosine coil 3*b* (output from the cosine coil 3*b* is not illustrated) of the output windings 3** voltages having amplitudes corresponding to each rotational angle of the rotor.

Here, in a case in which the sine coil **3*a* is broken at time $t_1$, the input voltage at the positive side of the amplifier circuit 20 is pulled-up, then the input voltage at the negative side is simultaneously pulled-up through a pull-up resistor $R_P$, the buffer resistor $R_{S1}$, wire-breakage detecting resistor $R_0$, and buffer resistor $R_{S2}$. That is, both of the input voltages of the amplifier circuit 20 are pulled up; consequently, the output from the amplifier circuit 20 is fixed to a value determined by these resistor values and the gain G. When the output from the amplifier circuit 20 is fixed, a microcomputer 21 can detect that the amplitude of the output from the amplifier circuit 20 has become lower than a predetermined value, and also the deviation between the center voltage of the output from the amplifier circuit 20 and the center voltage in the normal operating state has exceeded an allowable level ($\pm V_S$); consequently, the microcomputer can detect that the wire breakage has arisen in the sine coil 3*a***.

Figure 3:
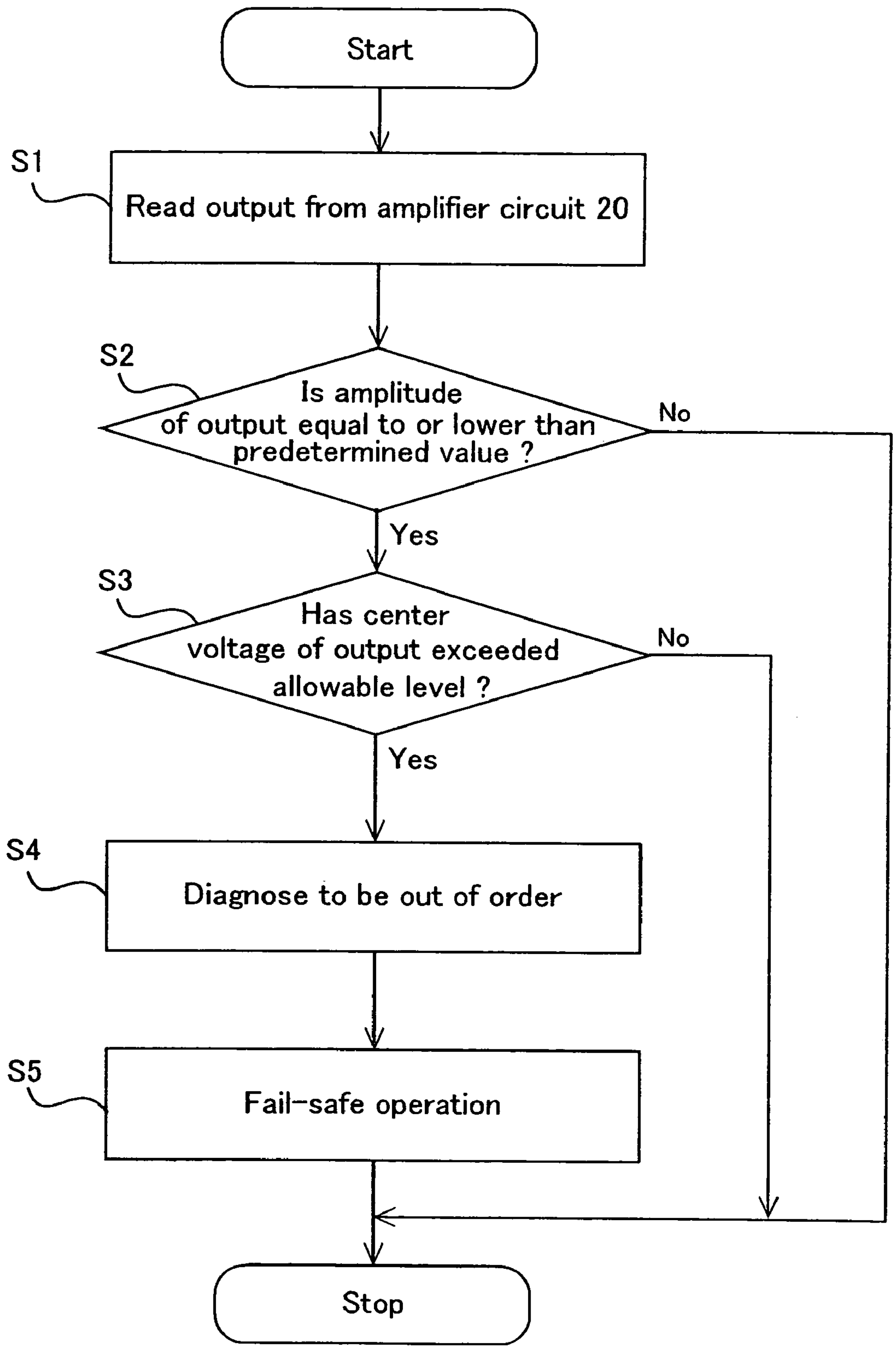
FIG. 3 is a flowchart representing an operation of the resolver malfunction diagnostic circuit according to Embodiment 1 of the present invention.

This operation will be explained following the flowchart illustrated in FIG. 3. The microcomputer 21 reads the output from the amplifier circuit 20 (step S1), then determines whether the amplitude of the output is equal to or lower than the predetermined value (step S2). When the amplitude is higher than the predetermined value, the microcomputer determines that the wire breakage has not arisen, and finishes the processing. On the contrary, when the amplitude is equal to or lower than the predetermined value, the microcomputer determines whether the deviation between the center voltage of the output and the center voltage in the normal operating state has exceeded the allowable level (step S3). According to this determination, when the deviation is below the allowable level, the processing is finished based on the determination that the wire breakage has not arisen; on the other hand, when the deviation has exceeded the allowable level, output windings are diagnosed to be out of order such that the wire breakage has arisen (step S4), and the processing is finished after a fail-safe operation has been performed (step S5) following a predetermined program.

Figure 4:
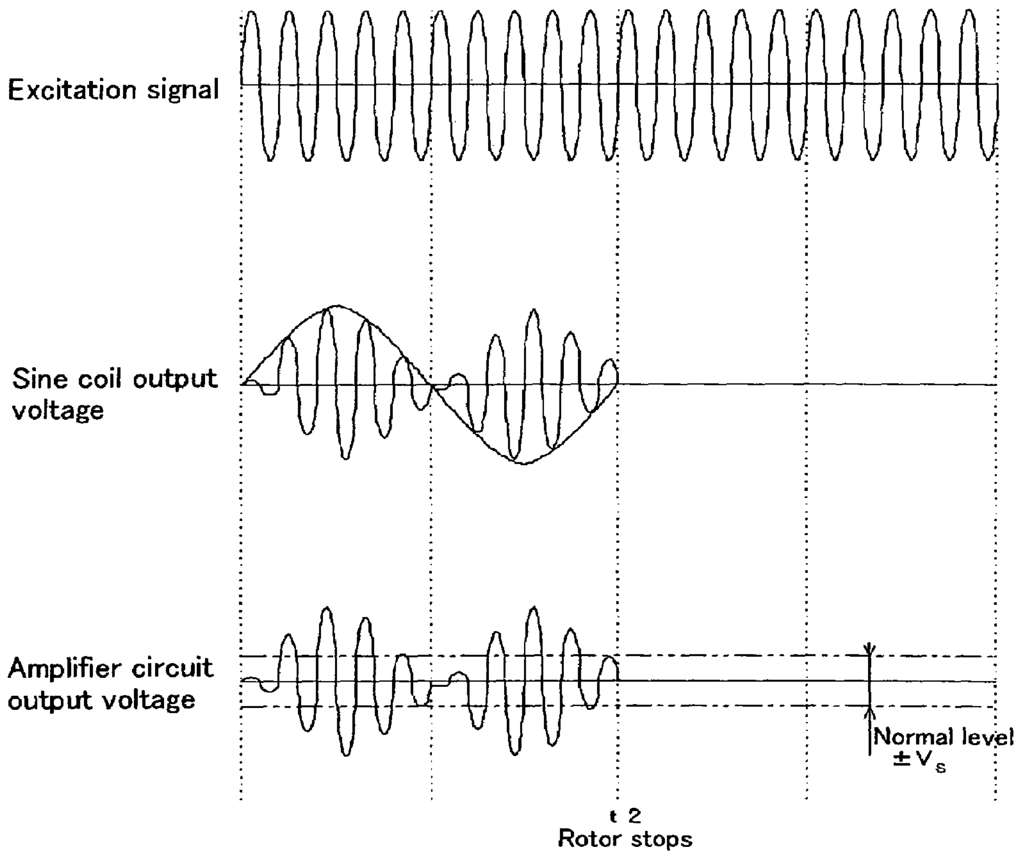
FIG. 4 is a waveform chart representing an operation of the resolver malfunction diagnostic circuit according to Embodiment 1 of the present invention.
Figure 5:
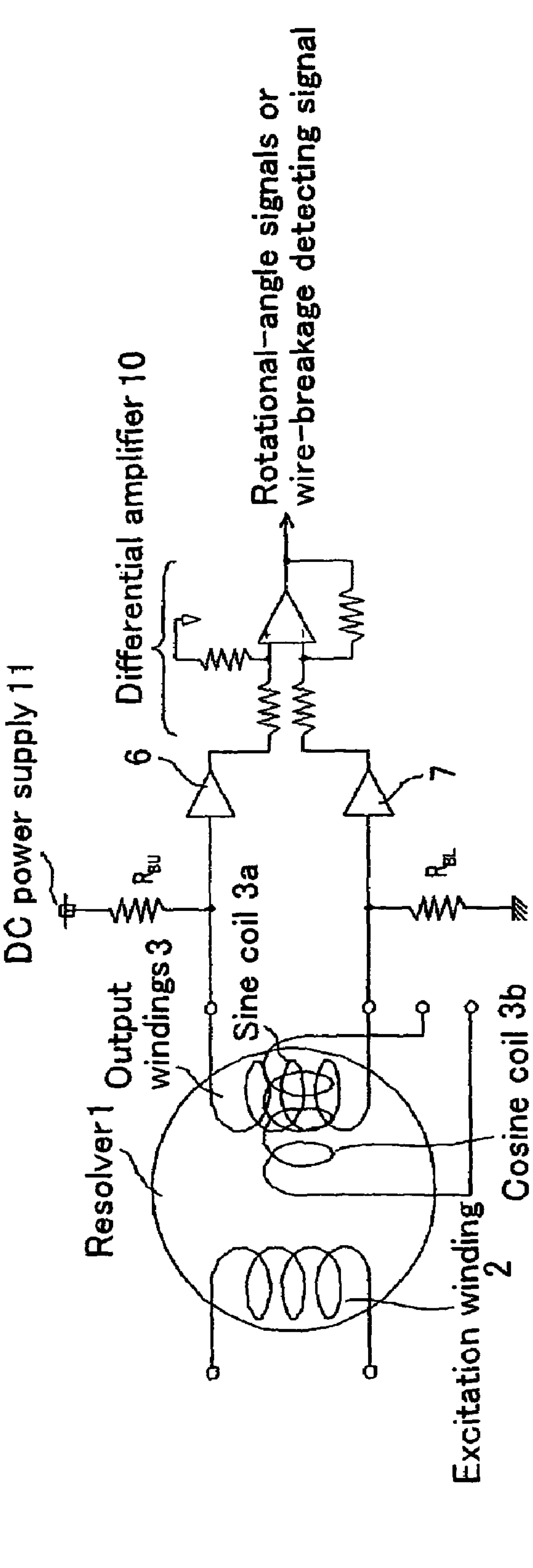
FIG. 5 is a circuit diagram illustrating a configuration of a conventional resolver malfunction diagnostic circuit.

Meanwhile, in the output from the sine coil 3*a*, its amplitude can be small according to the rotational angle of the rotor even though the wire breakage has not arisen. FIG. 4 illustrates a case in which the rotor stops its rotation, from a rotating state, at time $t_2$ and at an angle in which the output amplitude of the sine coil 3*a* is zero. In this case, although the output amplitude of the sine coil 3*a* becomes zero, and the amplitude is determined to be equal to or lower than the predetermined value (step S2), its center voltage of the output changes little from the center voltage in the normal operating state, and does not exceed the allowable level ($\pm V_S$); consequently, the microcomputer never makes wrong determination that the wire breakage has arisen in the sine coil 3*a* (step S3).

As described above, a resolver malfunction diagnostic circuit according to the present invention can accurately detect an occurrence of wire breakage independent from the rotational angle of the resolver rotor, by determining that wire breakage has arisen when the amplitude of the output from the resolver output winding is equal to or lower than a predetermined value and the deviation between its center voltage and the center voltage in the normal operation state exceeds an allowable level. Moreover, in this resolver malfunction diagnostic circuit, a bias circuit (a bias resistor) need not be specifically provided, and therefore its circuit configuration is simplified; consequently, an effect can be obtained in that the cost down and reliability improvement for the resolver malfunction diagnostic circuit can be realized, and its power consumption can be reduced.

Although the operation of only the sine coil 3*a* was explained in the above described embodiment, it is needless to say that wire breakage in the cosine coil 3*b* can also be similarly detected. In addition, the operation of the malfunction determination has been explained, in the above described embodiment, based on the voltage, amplified using the amplifier circuit 20, of the output from the output windings 3; however, the amplifier circuit 20 may be omitted so that the malfunction determination is performed based on the output itself from the output windings 3.

According to the resolver malfunction diagnostic circuit related to the present invention, the circuit configuration can be simplified, and the cost down and reliability improvement for the resolver malfunction diagnostic circuit can be realized. Moreover, any bias circuit for the malfunction diagnosis can be eliminated, and the electric power consumption can be reduced.

The invention is not limited to the above described embodiment, and various changes and modifications may be made in the invention without departing from the spirit and scope thereof.

What is claimed is:

1. A resolver malfunction diagnostic circuit including a resolver-signal inputting circuit for, in response to rotation of a rotor, receiving a signal from a resolver that outputs from its output winding a rotational-angle signal corresponding to the rotor rotational angle, characterized in that the output winding is determined to be out of order when the amplitude of the output from the output winding is equal to or lower than a predetermined value, and a deviation between the center voltage of its output voltage and the center voltage in the normal operating state exceeds an allowable level.

* * * * *